Aug. 11, 1953    A. S. CHIPLEY    2,648,398
INERTIAL AIR CLEANER
Filed April 21, 1951    3 Sheets-Sheet 1
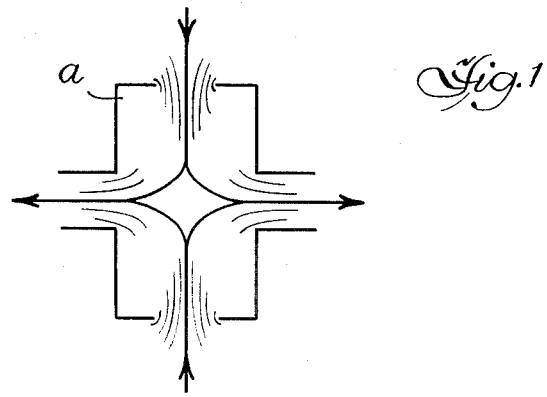
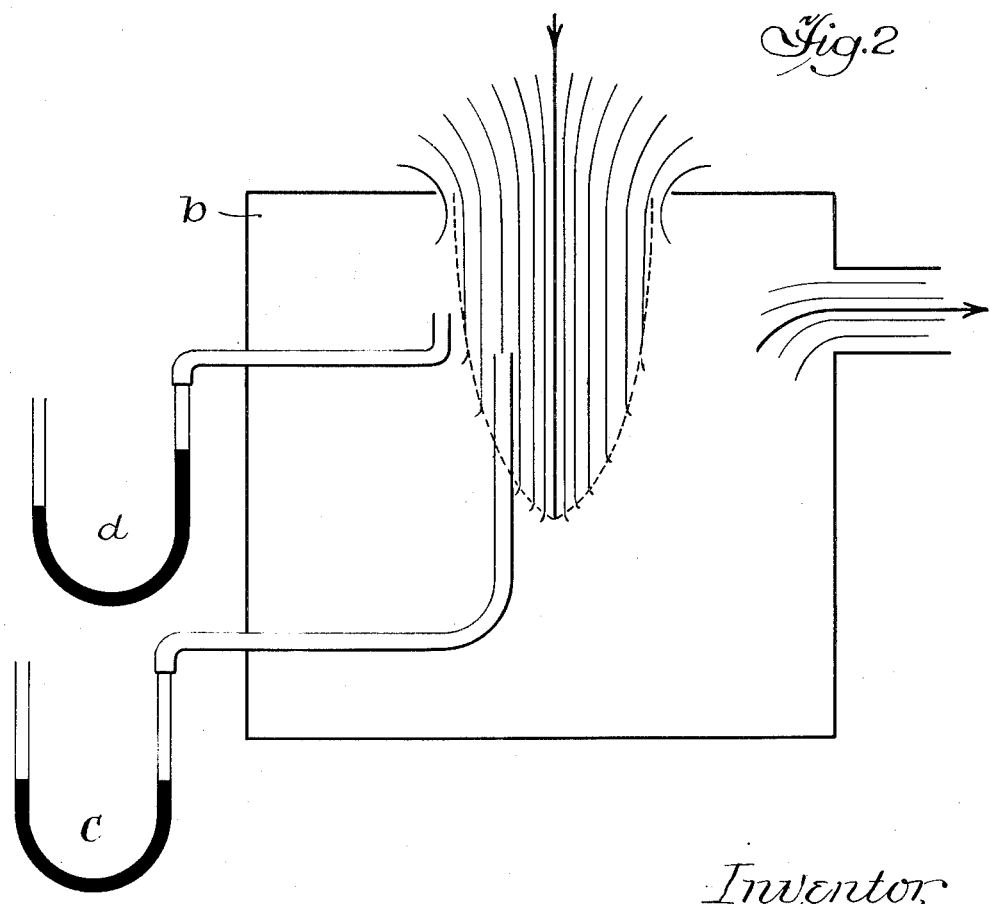
Inventor,
Alfred S. Chipley,
By: Jones, Teech and Darbo Attys Aug. 11, 1953 A. S. CHIPLEY 2,648,398
INERTIAL AIR CLEANER
Filed April 21, 1951 3 Sheets-Sheet 2

Inventor
Alfred S. Chipley,
By: Jones, Teach and Darbr Attys

Aug. 11, 1953  A. S. CHIPLEY  2,648,398
INERTIAL AIR CLEANER
Filed April 21, 1951  3 Sheets-Sheet 3
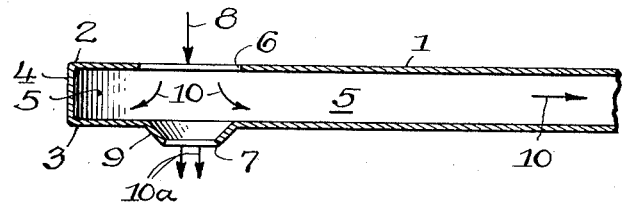
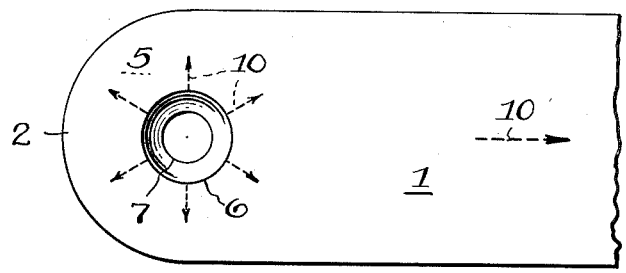
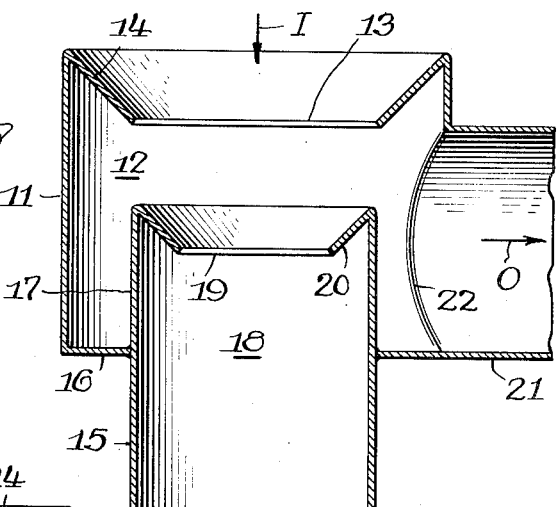
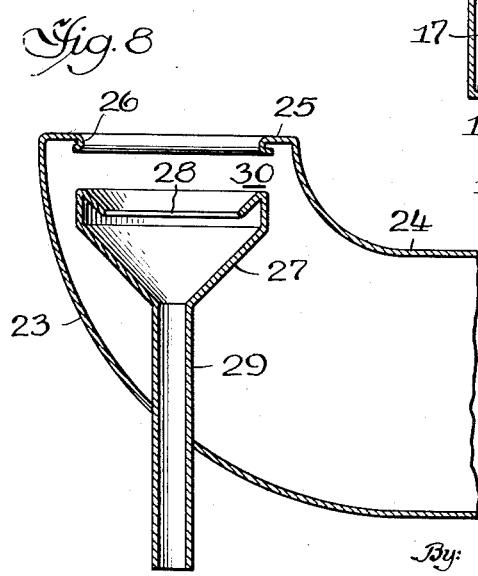
Inventor
Alfred S. Chipley
By Jones, Tesch and Darbo
Attys Patented Aug. 11, 1953

2,648,398

UNITED STATES PATENT OFFICE 2,648,398

INERTIAL AIR CLEANER

Alfred S. Chipley, Bokeelia, Fla., assignor to Burgess-Manning Company, Libertyville, Ill., a corporation of Illinois Application April 21, 1951, Serial No. 222,271

7 Claims. (Cl. 183—105)

This invention relates to devices for separating solid or liquid particles from gases in which such particles are entrained, and particularly to inertial air cleaners wherein particles are removed from a stream of air or other gases. This application is a continuation-in-part of Alfred S. Chipley application Serial No. 768,735, filed August 15, 1947, now abandoned, and includes further exposition of the operation of the invention therein disclosed.

The principal object of the invention is to provide an extremely simple and efficient particle separator which operates continuously without diminution of efficiency and without attention. The device has no moving parts and requires no filtering elements or scrubbing media and therefore requires no servicing.

A further and important object of the invention is the provision of such a device wherein the particle trap or outlet is open to the atmosphere and the particles are continuously expelled from the apparatus. There is no flow of gases through the particle trap.

Further objects and the many advantages of the invention will become apparent as the description proceeds.

In the accompanying drawings,

Figures 1 to 4, inclusive, are diagrammatic illustrations employed as a part of the description of the invention to permit complete disclosure and promote a full understanding thereof;

Fig. 5 is a cross-sectional view of a simple form of the invention;

Fig. 6 is a plan view of the device of Fig. 5;

Fig. 7 is a cross-sectional view of a slightly modified form of the invention;

Fig. 8 is a cross-sectional view of the invention incorporated in the elbow of a duct.

Figure 3:
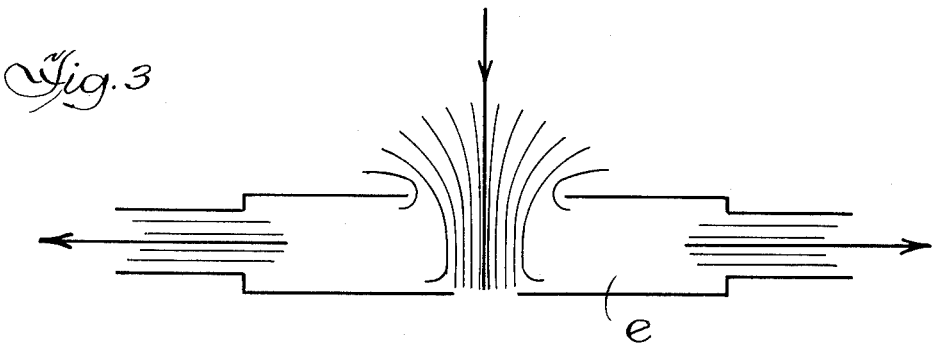

A wide variety of relatively intricate forms of air cleaning equipment has heretofore been devised and used for the more or less complete removal of solid and liquid particles from air. Excepting apparatus which employs filtering or washing media, such equipment generally utilizes the inertia of the particles entrained in a stream of air to effect separation. The most common form is the centrifugal type of separator wherein the air is caused to whirl rapidly within the cyclone chamber and the particles settle or are trapped at the periphery of the chamber.

The present invention consists essentially of a chamber having an air inlet and a particle outlet in line with the flow of air through the inlet, and a clean air outlet. The location of the particle outlet is critical, as will be explained fully hereinafter. The chamber is open to the atmosphere through both the air inlet and the particle or dust outlet. Suction is applied at the clean air outlet.

Under all but certain conditions, air will flow into a continuously evacuated chamber through both of two openings in the walls of the chamber connecting the interior thereof to the atmosphere. When the certain conditions obtain, air will flow into the continuously evacuated chamber through only one of two openings in the walls thereof connecting the interior to the atmosphere. This latter phenomena, an apparent paradox, is basic to the operation of the invention. Because the specification and claim-definition of the invention necessitate an understanding of, and reference to, the characteristics of dynamic flow of air into the cleaner and the relationship between dynamic or velocity pressures or heads and static pressures or heads, the operation of air cleaners embodying the invention will be set forth with considerable particularity in connection with the diagrammatic illustrations of Figures 1 to 4.

Referring first to Fig. 1, chamber $a$ is provided with four openings in the walls thereof. This chamber may be cylindrical and the openings in the top and bottom walls may be concentrically located at the axis of the cylinder, the side openings being in the cylindrical walls of the chamber. It will be noted that the axial dimension of the chamber is relatively large as compared with the diameter thereof.

When suction is applied to the openings in the side walls of cylindrical chamber $a$, a pressure differential is established between the interior of the chamber and the surrounding atmosphere. This difference in pressure or head causes air to be drawn into the chamber through both the top and bottom openings, or, stated differently, atmospheric pressure, being greater than the pressure obtaining within the chamber, forces the air to flow into the chamber through both top and bottom openings. The direction of flow of air through the several openings in the walls of the chamber is indicated by the arrows and flow lines, the continuous, heavier lines indicating what may be considered to be the axes of the several flow streams.

Particular attention is directed to the nature of the flow streams entering the chamber through the inlet openings at the top and bottom of the chamber. As indicated, air flows from the atmosphere toward these inlet openings from all directions beyond the walls of the chamber, converging toward the inlet openings and then passing through into the interior of the chamber. The flow streams, thus formed, continue in a direction approximately normal to the chamber wall surfaces surrounding the inlet openings. Following passage through the inlet openings, air at the fringe of each flow stream tends to flow outwardly from the axis of the stream into the volume of the chamber and toward the suction outlets. This process continues as the air continues its forward movement in each stream, the cross section of that portion of the stream which continues to move in substantially the direction of the axis of the stream as it passes through the inlet opening gradually diminishing until the point is reached at which the turning of the incoming stream is completed. Where the inlet opening is round, the zone of flow stream within which flow is almost entirely in a direction parallel to the axis of the stream as it passes through the inlet opening is confined within a conoidal surface extending from the periphery of the inlet opening into the chamber. The velocity, both speed and direction of flow, of the air within this conoidal zone is substantially uniform. This conoidal zone, and its counterparts associated with openings which are not circular, will be referred to hereinafter as the "zone of uniform dynamic flow."

Although imaginary in the sense that there is no visible surface enclosing the zone of uniform dynamic flow, the contours of this zone for a particular apparatus may actually be established. In the enlarged diagrammatic illustration of Fig. 2, air is drawn into chamber b through an opening in the top wall of the chamber as a consequence of suction applied at one side. Withdrawal of air from one, instead of two opposite sides, will result in some slight loss of symmetry, but this is ignored for present purposes. The characteristics of the incoming flow stream are similar to those described in connection with Fig. 1 and are indicated by the flow lines and arrow applied to the axis of the flow stream. If, now, one open end of the U-tube manometer c is placed so that the tube opening is located within the zone of uniform dynamic flow, facing upstream, as shown, the other open end of the U-tube being open to the static pressure of the atmosphere, the reading of the manometer will be zero. This means that the total pressure or head at the open end of the tube within the zone of uniform dynamic flow is equal to atmospheric pressure. The pressure at any point within chamber b and outside of the zone of uniform dynamic flow will be shown by U-tube manometer d to be less than atmospheric pressure. By using the tube of manometer c as a probe and moving it about in chamber b, the contours of the zone of uniform dynamic flow (indicated by dotted lines) associated with the inlet opening in the top wall of the chamber may be established.

The total pressure or head of a stagnant body of air is equal to the static pressure of the body. Thus, atmospheric pressure is generally given as a static pressure. The total pressure or head of air in motion is the sum of the static head and velocity head at a given point. Static pressure represents a potential energy, velocity pressure a kinetic energy, and the total energy is the sum of the two parts. When, under the influence of suction applied to the openings in the side walls of chamber a, air flows into the chamber through the inlet openings, the static pressure of the atmosphere is converted, in part, to velocity head as the air begins to move and accelerate toward the inlet opening. It follows that the total head exerted in the direction of the flow stream as it passes through the inlet opening may be considered to be equal to static atmospheric pressure. This concept is fundamental to an understanding of the operation of the air cleaner of the invention.

If the dimensions of chamber a shown in Fig. 1 are changed so that the height is small compared with its diameter, as in chamber e, Fig. 3, and the opening in the bottom wall of the chamber is smaller by a proper proportion than the opening in the top wall thereof, suction applied at the sides of the chamber will result, not in the inflow of air through both top and bottom openings, but the inflow of air through the top opening only. The size and location of the opening in the bottom wall of chamber e is such that it is located within the zone of uniform dynamic flow associated with the top opening of the chamber. Since, as pointed out above, the total head in the direction of the axis of the flow stream at any point within the zone of uniform dynamic flow is equal to atmospheric pressure, there is no pressure differential between points immediately within the opening in the bottom wall of the chamber and points immediately without this opening. There being no pressure differential, there is no force to establish flow of air through this bottom opening, and there is none. The incoming air stream turns abruptly as it approaches the bottom opening of chamber e and flows laterally to the outlets in the side walls.

Figure 4:
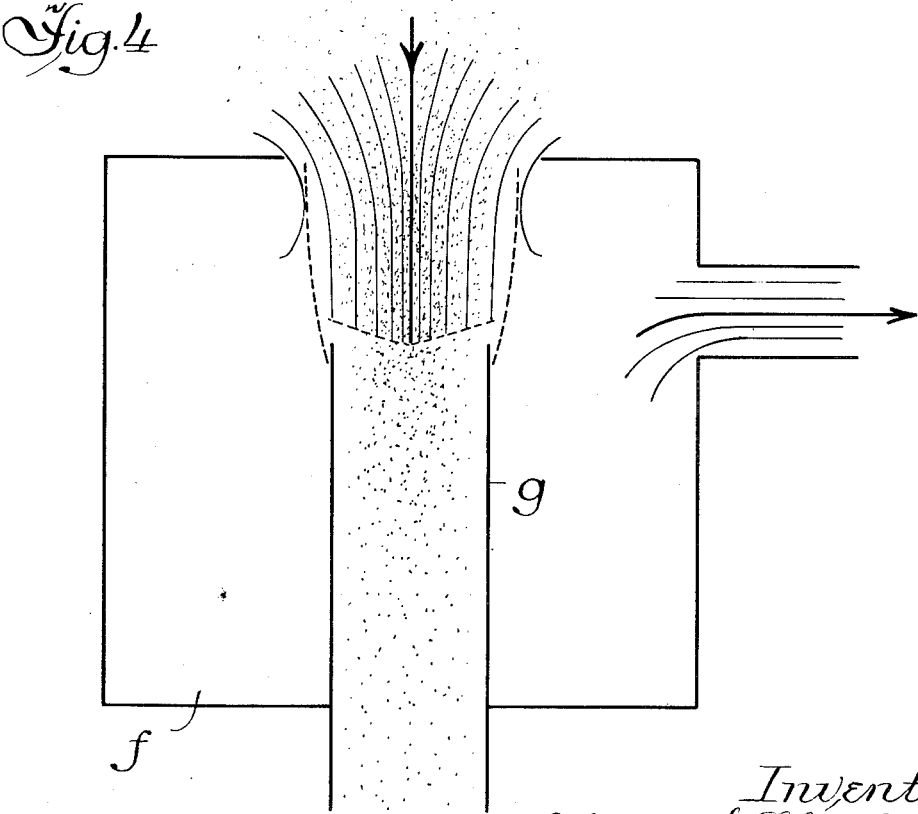

Fig. 4 diagrammatically illustrates a device which is functionally the same as Fig. 3. Instead of the very shallow chamber e, chamber f has the greater depth which is more satisfactory for practical reasons in an air cleaner, and the static pressure of the atmosphere is brought to bear against the head of the incoming air stream by means of a tube g. Both ends of tube g are open. The pressure front of the incoming air stream is met and counterbalanced by atmospheric pressure at the open end of the tube within the zone of uniform dynamic flow with the result that there is no flow of air within tube g. Thus, the open end of tube g is comparable to the opening in the bottom wall of chamber e, Fig. 3, and the open end of the tube of manometer c, Fig. 2. The particles of dirt carried by the incoming air, indicated by the dots in Fig. 4, having greater inertia than the air, tend to concentrate in the middle of the flow stream and are projected from the stream at the pressure interface between the dynamic front and static zone at the open upper end of tube g. The dirt particles are thus returned to the atmosphere at the outlet of tube g.

The simplest embodiment of the invention is illustrated in Figs. 5 and 6. The body of the separator there illustrated is conveniently formed by the end of duct 1 through which clean air is drawn from the separating apparatus. The end 2 of the duct top and bottom walls are preferably rounded for reasons which will presently appear. Side walls 4, together with top wall 2 and bottom wall 3, of the duct form a collecting chamber 5 which opens into the duct 1.

An air inlet opening 6 is provided in top wall 2 of collecting chamber 5. This opening is preferably, though not necessarily, circular. A dust outlet opening 7 is provided in axial alignment with inlet opening 6; that is, in line with the flow of air through inlet opening 6 as indicated by arrow 8. The portion of the bottom wall of the duct structure immediately surrounding dust outlet 7 may be formed to provide a funnel-like section 9 encircling and leading to outlet opening 7. Dust outlet opening 7 should have approximately the same shape as air inlet opening 6.

The relative dimensions of air inlet opening 6 and dust outlet opening 7; specifically, their areas, shapes, and distance apart, are such that the dust outlet is located within the zone of uniform dynamic flow associated with inlet opening 6 during the normal operation of the device.

In operating the simple separating device thus described, suction is applied to collecting chamber 5 by connecting duct 1 to the intake of a suitable blower or other air moving apparatus. Under the influence of this suction, air is drawn into the separating apparatus through inlet opening 6, as indicated by arrow 8. This stream of air carries the particles which are to be separated from the gaseous vehicle. Upon passage through inlet opening 6 and approach to dust outlet 7, the stream of air abruptly spreads and flows radially outwardly in all directions into collecting chamber 5. Because the solid or liquid particles entrained in the entering air stream possess greater inertia, by reason of their greater density, than the gases, these particles project through dust outlet 7 and are thus ejected from the apparatus. The flow of air within the apparatus is indicated by arrows 10 and the direction of passage of the particles is indicated by arrows 10a.

It will be clear from the foregoing detailed discussion of the mode of operation of the invention that the proper operation of the device of Figs. 5 and 6 in the manner described is dependent upon the relationship of dust outlet opening 7 to air inlet opening 6 whereby the former is located within the zone of uniform dynamic flow through inlet opening 6 whereby the entrance of air into chamber 5 through dust outlet 7 is prevented. For the best operation of the air cleaning apparatus, collecting chamber 5 should entirely surround the gap through which the air flows as it turns from the main stream and spreads radially. The depth of collecting chamber 5 is preferably adequate to bring about a substantially equal flow of air in all directions from the axis of the main stream. Symmetry with respect to this axis is highly desirable and contributes to the efficient operation of the device.

The device of Figs. 5 and 6 is intended for operation in a relatively still atmosphere. Since, as hereinabove pointed out, the velocity pressure of the air stream flowing into the cleaner at inlet opening 6 is a mere conversion of the static atmospheric pressure to its kinetic equivalent, and the atmospheric pressure obtaining at dust outlet opening 7 and immediately thereabove will exactly balance the total pressure of the inflowing stream and cause the stream to spread, as described, it will be understood that this balance of pressures may be disturbed by appreciable air movements of the atmosphere surrounding the inlet opening of the apparatus.

Another simple embodiment of the invention is illustrated in Fig. 7. The body of the separator there illustrated is a shell 11 having an air inlet opening 13 in the top wall of the collecting chamber 12 formed by shell 11. For reasons already pointed out, shell 11 is preferably symmetrical with respect to the air of the inflowing air stream. For example the cross section of the shell may be circular, elliptical, square, polygonal, or otherwise similarly shaped, and inlet opening 13 is preferably concentric with shell 11.

The diameter of inlet opening 13 is less than that of shell 11. The annular top wall of the shell may be in the form of a funnel-like section 14, as illustrated, forming a converging guide for the air stream, or it may be a simple in-turned flange forming an ordinary sharp-edge orifice for the entrance of the air with entrained particles into the separating zone of the device.

A tubular member 15 extends through the bottom wall 16 of the shell in alignment with inlet opening 13. The inner portion 17 of this member forms a trap 18 into which the dirt particles are projected through an opening 19 at the upper extremity of the tubular member 15. Opening 19 is shaped similarly to inlet opening 13 and is in approximate alignment with the axis of the flow stream through the air inlet opening. The diameter of opening 19 is less than that of opening 13 and opening 19 is located within the zone of uniform dynamic flow through opening 13. A funnel-like section 20 depends from the upper extremity of tubular section 17 and converges to opening 19. The trap is spaced from member 14 to permit the flow of air between these elements and into collecting chamber 12. The lower end of tubular member 15 is open, the interior of trap 18 thus being open to the atmosphere.

A clean air outlet tube or duct 21 connects with collecting chamber 12 at a suitable opening 22 in a side wall of shell 11.

In using the air cleaner thus described, suction is applied to collecting chamber 12 at opening 22 by connecting clean air outlet evacuating conduit 21 to the intake of a suitable blower or other air moving apparatus. The air cleaning device generally forms the intake terminus of the air transmission system and generally, although not necessarily, the unit is installed in vertical position as illustrated in the drawing.

Thus installed, air with entrained particles flows into the separating zone through inlet opening 13 as indicated by arrow I. Although the interior of the air cleaner is open to the atmosphere through opening 19 as well as through opening 13, all of the air withdrawn through clean air outlet conduit 21 flows into the cleaner unit through inlet opening 13. As with other embodiments of the invention, there is no inward flow of air through opening 19 under normal operating conditions.

The stream of air flowing into the cleaner through inlet opening 13 as a result of the subatmospheric pressure condition maintained by the blower within the collecting chamber 12 spreads and flows radially outwardly into the collecting chamber and thence into outlet conduit 21. Although the air stream turns abruptly as it spreads over the mouth 19 of trap 18, the particles entrained in this air stream, having greater inertia than the air, continue their motion in the direction of the entering air stream and project through opening 19 into trap 18 and are then free to fall through tube 15. The particles thus expelled from the air may be collected or may be permitted to fall upon the ground. The clean air passes through outlet conduit 21 as indicated by arrow O.

Although, as stated above, it is generally preferable to install the air cleaner in vertical position in order to facilitate the discharge of particles from trap 18, the device may be used in a horizontal position and the momentum of the particles as they project into the trap relied upon to expel them from the apparatus.

An air cleaner installed as a part of the elbow of an air conduit is illustrated in Fig. 8. Elbow 23 is connected to an evacuation conduit 24 which, in turn, is connected with a suitable blower, not shown. The inlet end of elbow 23 is partially closed by an annular member 25 which provides a preferably circular air inlet opening 26 concentric with and smaller than the end of elbow 23. A dust trap 27 having a mouth 28 is installed within elbow 23 with the mouth in alignment with inlet opening 26. The trap structure is spaced from closure member 25 to permit the flow of air through the gap thus provided. A downspout 29 connects with the bottom of dust trap 27 and passes through the wall of elbow 23 and terminates outside of the apparatus.

It will be noted that the essential elements of the device of Fig. 8 are the same as those described in greater detail in connection with the diagrammatic illustrations of Fig. 4 and the apparatus illustrated in Figs. 5 to 7. It may also be noted that only slight variation in this particular structure is necessary to adapt it to use in the top end of a straight vertical duct or pipe. Instead of curving the duct, as in the case of the elbow, this member may be straight and downspout 29 curved or arranged at an angle to pass through a wall of the duct to the interior of the apparatus. Operation of the several devices is also similar, particle laden air flowing into the separator through inlet opening 26. The entrained particles project into dust trap 27 as the air stream spreads and turns abruptly in passing over mouth 28 of the dust trap and into collecting chamber 30 formed by the walls of elbow 23. These particles fall through downspout 29 and pass from the apparatus through the open outer end of the downspout. The cleaned air is supplied to conduit 24.

Several alternative forms of the various elements of the apparatus have been shown and described in connection with the several embodiments of the invention. These examples indicate the variety of forms that may be employed in carrying out the inventive concept. The several elements of the different devices shown may be interchanged in adapting the cleaning apparatus to particular applications.

Invention is claimed as follows:

1. In an apparatus for removing entrained particles from air, a shell forming a chamber, an air inlet opening in said shell for the admission of a stream of air into said chamber, said inlet opening providing substantially unobstructed communication of said chamber with the atmosphere, a dust outlet opening in said shell, said dust outlet opening being smaller than said air inlet opening, aligned therewith and spaced therefrom without intervening obstruction a predetermined distance, said dust outlet opening being open to the atmosphere, an air outlet opening in said shell, and evacuation means connected to said air outlet opening, whereby when suction is applied to said evacuation means air will be withdrawn laterally from the space between the air inlet opening and the dust outlet opening, said dust outlet opening being located wholly within the zone of uniform dynamic flow of a stream of air entering said chamber through said air inlet opening and the air outlet opening being located outside of said zone of uniform dynamic flow.

2. In an apparatus for removing entrained particles from air, a shell forming a chamber, an air inlet opening in said shell for the admission of a stream of air into said chamber, said inlet opening providing substantially unobstructed communication of said chamber with the atmosphere, a dust trap extending into said chamber and having a mouth smaller than said air inlet opening, said mouth being in alignment with and spaced from the air inlet opening without intervening obstruction a predetermined distance, said dust trap being open to the atmosphere, an air outlet opening in said shell, and evacuation means connected to said air outlet opening, whereby when suction is applied to said evacuation means air will be withdrawn laterally from the space between the air inlet opening and the mouth of said dust trap, the mouth of said dust trap being located wholly within the zone of uniform dynamic flow of a stream of air entering said chamber through said air inlet opening and the air outlet opening being located outside of said zone of uniform dynamic flow.

3. Apparatus in accordance with claim 2 wherein the shell is circular in horizontal section and the air inlet opening is located in the top and the air outlet is located in the side thereof.

4. Apparatus in accordance with claim 3 wherein the air inlet opening is concentric with the shell.

5. Apparatus in accordance with claim 2 wherein the dust trap comprises an open-ended tubular element passing through the shell and a portion of the chamber toward the inlet opening.

6. In an apparatus for removing entrained particles from a stream of gases comprising a substantially cylindrical shell arranged in vertical position and defining a collecting chamber, the top wall of said shell having a circular air inlet opening therein for the admission of a stream of air into said chamber, said inlet opening being concentric with and having a smaller diameter than said shell, a tubular element having a diameter approximately equal to that of the said inlet opening and arranged coaxially with said shell and passing through the end of said shell opposite said inlet opening, the inner end of said tubular element being spaced from the top wall of said shell without intervening obstruction and having a partial closure member converging downwardly to a circular opening located a predetermined distance from said inlet opening, said circular opening being concentric with and of smaller diameter than said inlet opening, the outer end of said tubular element being open, and a clean air outlet duct connected to said collecting chamber through a side wall of said shell, whereby when suction is applied to said outlet duct air will be withdrawn laterally from the space between the air inlet opening and the inner end of said tubular element, the inner end of said tubular element being located wholly within the zone of uniform dynamic flow of a stream of air entering said chamber through said air inlet opening and the connection of the air outlet duct to the side wall of said shell being located outside of said zone of uniform dynamic flow.

7. Apparatus for removing entrained particles from a stream of gases comprising an air duct, an elbow connected with said duct at the intake end thereof, a partial closure at the inlet end of said elbow having a central substantially circular inlet opening therein for the admission of a stream of air into said duct, a dust trap comprising a receptacle disposed within said elbow and having a mouth in substantial alignment with said inlet opening, said mouth being smaller than said inlet opening and spaced therefrom without intervening obstruction a predetermined distance, said receptacle being spaced from the walls of said elbow, an open-ended tubular element connected with the bottom of said dust trap and terminating outside of said apparatus, and evacuation means connected to the end of the elbow remote from said inlet end thereof, whereby when suction is applied to said evacuation means air will be withdrawn laterally from the space between said air inlet opening and the mouth of said dust trap, the mouth of said dust trap being located wholly within the zone of uniform dynamic flow of a stream of air entering said elbow through the inlet opening thereof and the point of connection of the evacuation means to the elbow being located outside of said zone of uniform dynamic flow.

ALFRED S. CHIPLEY.

References Cited in the file of this patent

UNITED STATES PATENTS

| Number | Name | Date |
|---|---|---|
| 485,915 | Duckham | Nov. 8, 1892 |
| 2,289,474 | Anderson | July 14, 1942 |

FOREIGN PATENTS

| Number | Country | Date |
|---|---|---|
| 298,343 | Great Britain | Oct. 11, 1928 |
| 416,390 | Germany | July 14, 1925 |